Figure 1:
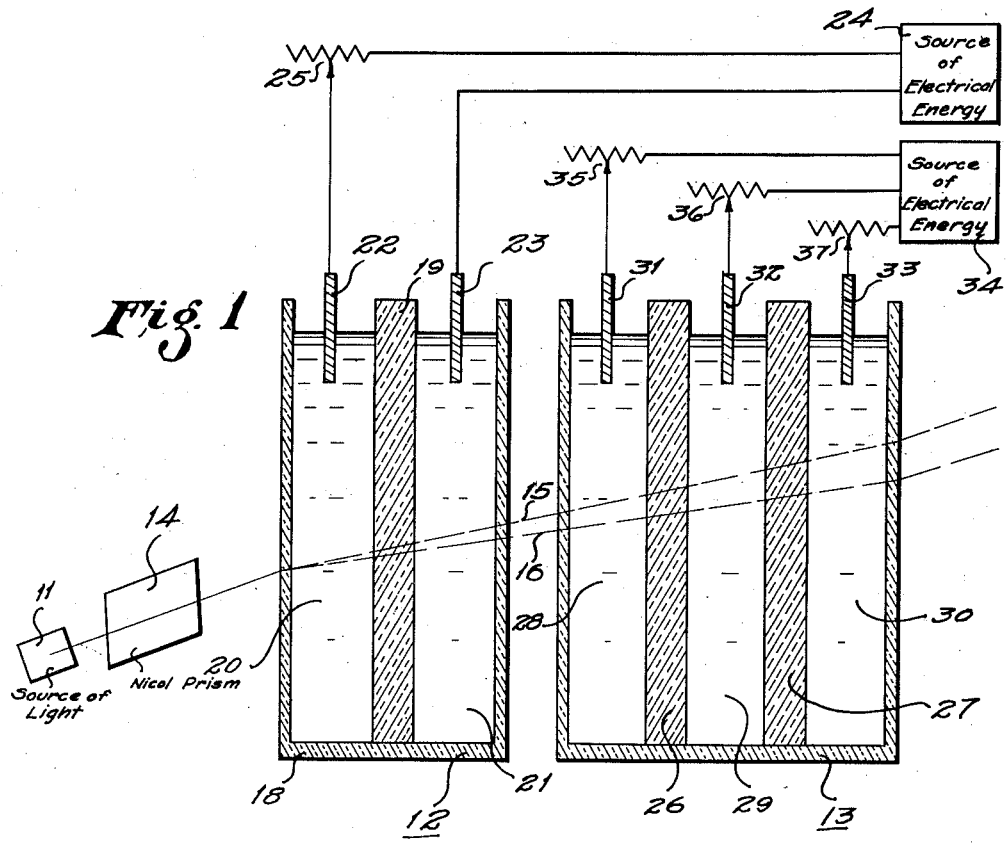

July 15, 1930.

T. W. SUKUMLYN 1,770,535

VARIABLE LIGHT REFRACTOR

Filed April 26 1927

INVENTOR.
THOMAS W. SUKUMLYN

BY

ATTORNEY.

Patented July 15, 1930

1,770,535

UNITED STATES PATENT OFFICE

THOMAS W. SUKUMLYN, OF LOS ANGELES, CALIFORNIA

VARIABLE-LIGHT REFRACTOR

Application filed April 26, 1927. Serial No. 186,801.

This invention relates to refraction, and particularly to a device whereby the angle of refraction through a transparent medium or mediums can be varied.

It is sometimes necessary in scientific or measurement work to make it possible to position a ray of light accurately. This has been done in the past by moving the refractor, such as a prism, bodily about an axis; but this is sometimes impracticable or undesirable. It is one of the objects of my invention to make it possible to vary the angle of refraction of a ray of light in a simple manner and without moving the refractor.

I have found that when a transparent dielectric medium through which light is to be transmitted is subjected to an electrostatic strain, as by imposing a difference of potential between its two surfaces, the angle of refraction can be varied by varying the intensity of the strain. It is thus another object of my invention to utilize this principle for varying the angle of refraction.

My invention possesses many other advantages, and has other objects which may be made more easily apparent from a consideration of one embodiment of my invention. For this purpose I have shown a form in the drawings accompanying and forming part of the present specification. I shall now proceed to describe this form in detail, which illustrates the general principles of my invention; but it is to be understood that this detailed description is not to be taken in a limiting sense, since the scope of my invention is best defined by the appended claims.

Referring to the drawing, the single figure is a diagrammatic scheme showing how my invention may be practiced.

In the drawings I show a plurality of refractors, constructed and operated in accordance with my invention. The source of light is indicated at 11, which can pass light through a light polarizer 14 such as a Nicol prism. The light then passes obliquely through one or more refracting devices, such as 12 and 13. The light rays are refracted through the refracting devices 12 and 13, in the course shown in general by the dotted line 15.

The refracting device 12 comprises a transparent insulation casing 18, across which extends the transparent dielectric 19 separating the casing 18 into two parts; one part accommodating the body of transparent electrolyte 20 and the other part, the body of transparent electrolyte 21. These bodies of electrolyte can be weak acid solutions or the like. They impress an electrical stress on the medium 19, and to accomplish this, these bodies are subjected to potential differences, as by the aid of a pair of electrodes 22, and 23, dipping therein. These electrodes are shown as connecting to a source of electrical energy 24, the potential difference of which can be adjusted as by a variable resistor 25.

It has been found that fluctuations in the potential difference applied to the electrodes 22, 23, cause corresponding variation in the angle of refraction through medium 19. These variations can be made easily controllable by providing for fine adjustment of the resistance 25. Thus it is possible to shift the light ray to other positions than that shown at 15; for example, to an extreme position 16.

The refracting arrangement 13 is substantially similar to the refracting arrangement 12 except that there are two dielectric mediums 26 and 27 which may be in the form of a gas, or a liquid, contained in a glass or transparent container. In this instance, the refractor arrangement has three distinct and separate isolated bodies of transparent electrolytes 28, 29 and 30, through which the light beam passes in succession. Each body of the electrolyte has a corresponding electrode 31, 32 and 33, which may be connected to a source 34, maintaining these electrodes 31, 32 and 33 at different potentials with respect to each other, which potentials can be varied to vary the angles of refraction, as by the aid of such devices as the variable resistances 35, 36 and 37. The operation of this refractor is substantially the same as that of refractor 12. Any number of banks of refractors can be used in this way to cause the refracted ray to assume any desired position. The important point in all of them is the creation of electric stresses that can be readily varied in order to vary the position of the beam.

I claim:

1. The method of varying the angle of refraction through a transparent dielectric medium, which comprises subjecting the medium to variable electric stresses.

2. The method of varying the angle of refraction through a transparent dielectric medium, which comprises covering both sides of the medium with a transparent electrolyte, and producing a variable difference in potential between the electrolyte on one side of the medium and that on the other side.

3. In combination, a transparent dielectric medium, and means for varying the angle of refraction through said medium, comprising means for varying the electric stress through the medium.

4. In a light refractor, a transparent dielectric medium, a body of transparent electrolyte on each side of the medium, and means for impressing a potential difference between the two bodies of electrolyte.

5. In a light refractor, a transparent dielectric medium, a body of transparent electrolyte on each side of the medium, and means for varying the angle of refraction through the medium, comprising means for varying the potential difference between the two bodies of electrolyte.

6. In a light refractor, a series of transparent dielectric mediums through which light is arranged to pass in succession, transparent electrolyte bodies, isolated from each other and intervening between the mediums, and means for impressing potential differences between the various bodies.

7. In a light refractor, a series of transparent dielectric mediums through which light is arranged to pass in succession, transparent electrolyte bodies, isolated from each other and intervening between the mediums, and means for varying the potential difference between the various electrolyte bodies to vary the angles of refraction.

In testimony whereof I have hereunto set my hand.

THOMAS W. SUKUMLYN.